Nov. 14, 1944.  C. A. BOLLWERK  2,362,533
TURNING MACHINE
Filed Dec. 10, 1942  3 Sheets-Sheet 1
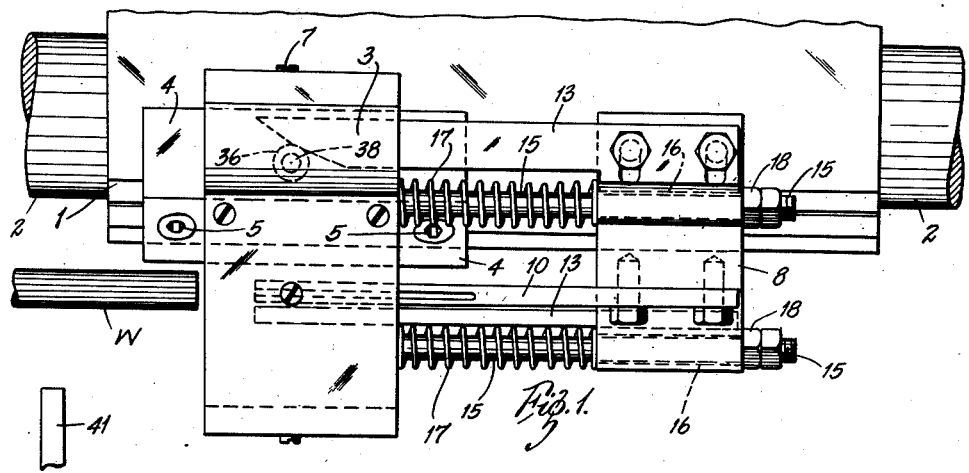
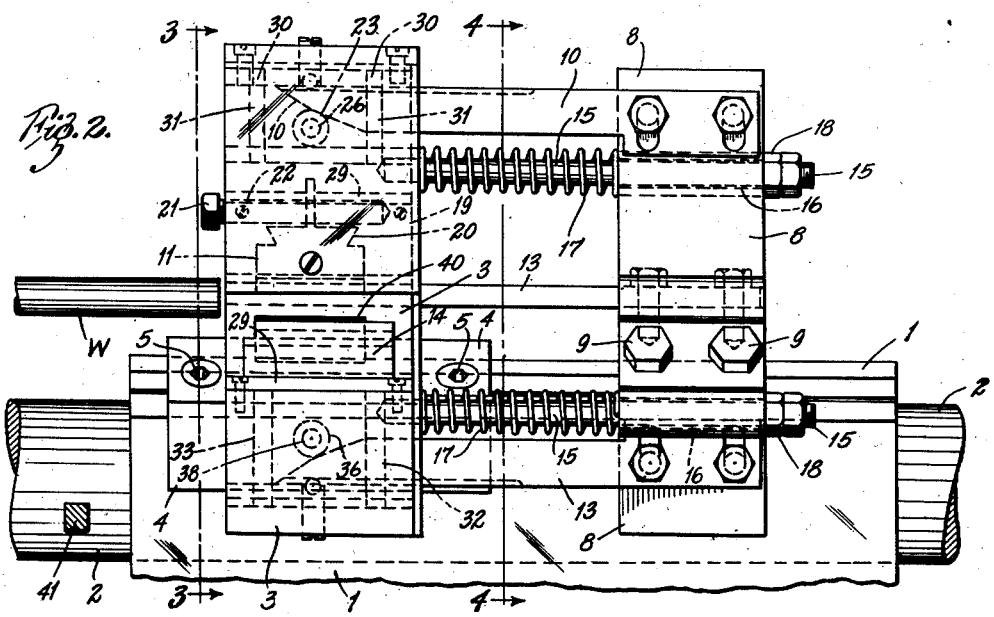
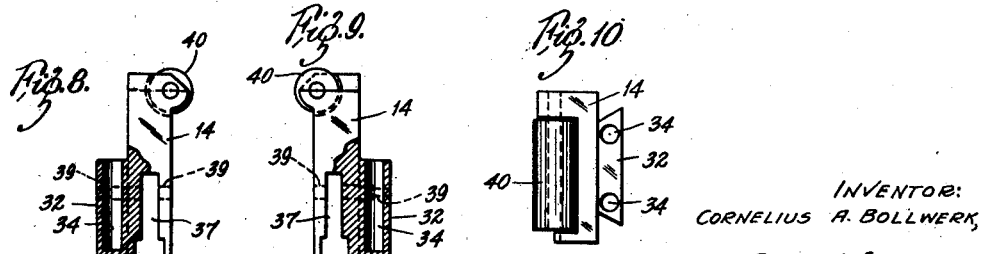
INVENTOR:
CORNELIUS A. BOLLWERK,
BY John H. Cassidy
ATTORNEY.

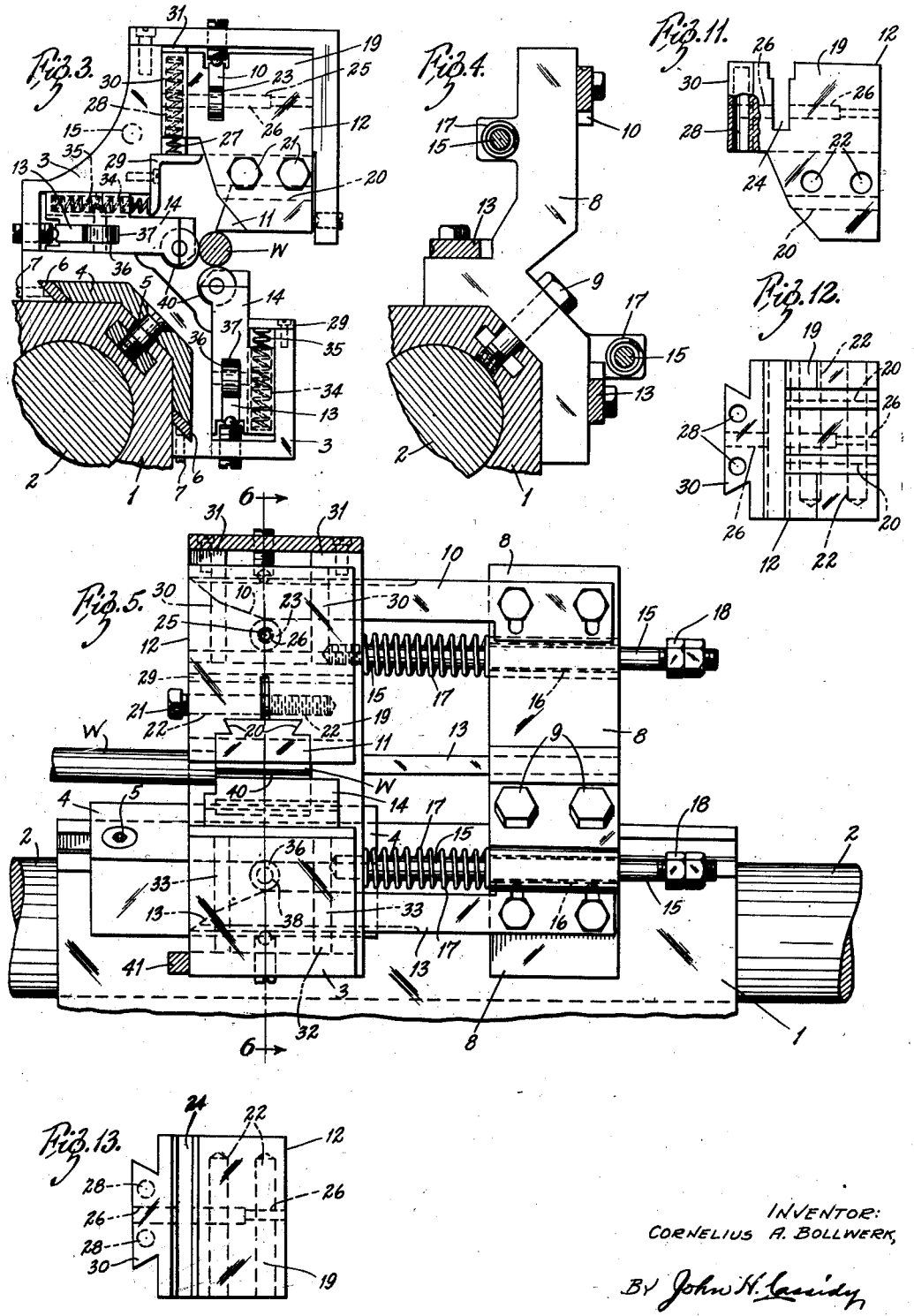

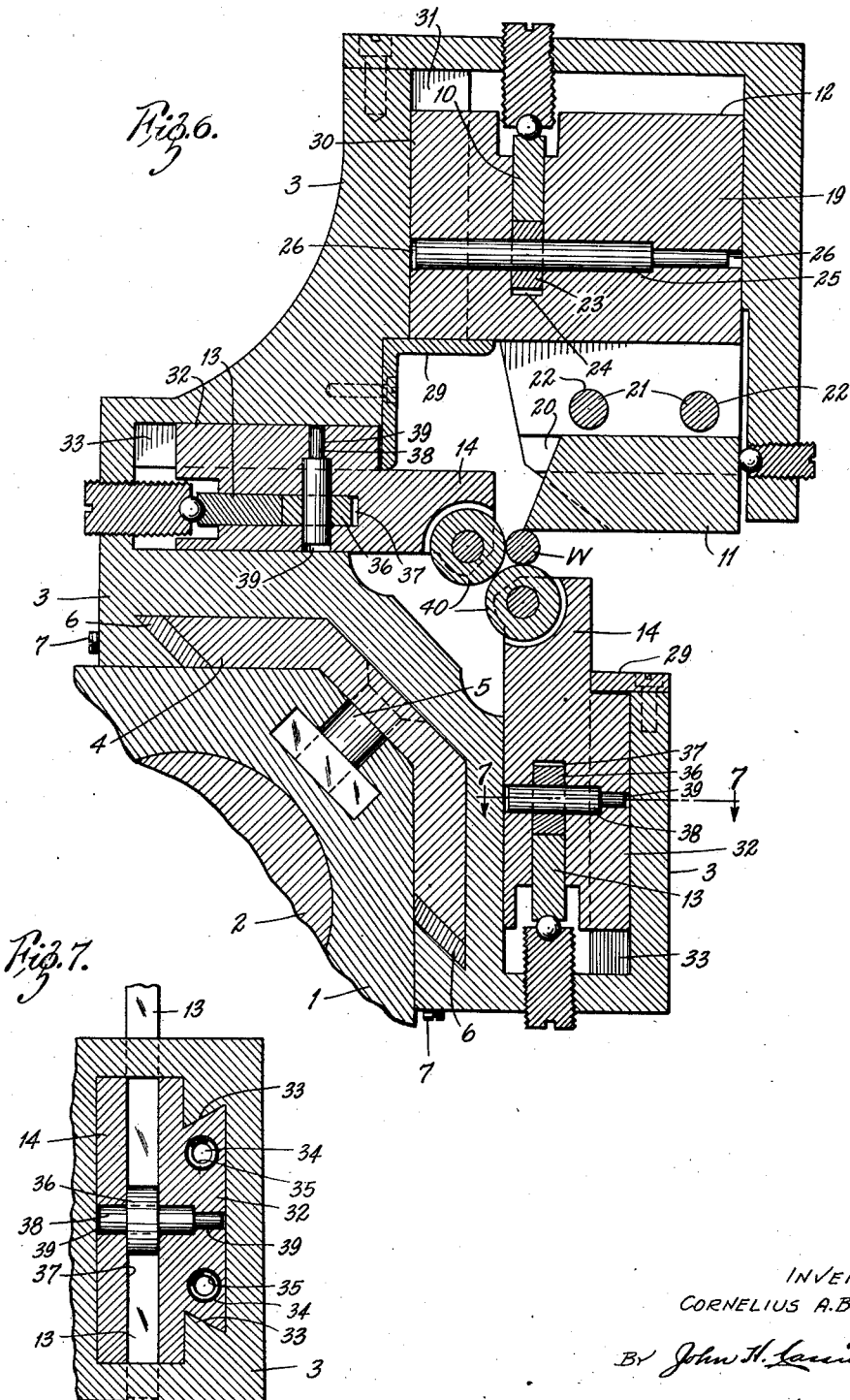

Patented Nov. 14, 1944

2,362,533

UNITED STATES PATENT OFFICE 2,362,533

TURNING MACHINE

Cornelius A. Bollwerk, St. Louis, Mo.

Application December 10, 1942, Serial No. 468,464

2 Claims. (Cl. 82—35)

This invention relates to a tool for use as an attachment in a lathe or other turning machine.

An object of this invention is to provide means for supporting work being turned against pressure of the cutting tool, with mechanism for advancing the support as the tool is advanced. In turning articles from rods for instance, the work will spring under the pressure of the cutting tool. In the present invention one or more supports in the form of rollers are provided opposite the tool, or, are so positioned that they will oppose the thrust of the cutting tool.

Further objects of the invention, and its advantages, will be apparent from the following detail description, taken in connection with the accompanying drawings. The embodiment shown in the drawings and specifically described, is designed and shown in connection with an automatic screw machine, and particularly a "Gridley" automatic. The "Gridley" is a well known commercial automatic screw machine having a plurality of spindles through which bar work is fed, or on which the work is held. In such a machine turning is performed simultaneously on the several pieces of work held by the spindles. The spindles as a whole are revolved intermittently so as to bring the work held by each spindle successively to several stations each provided with tools for performing a certain turning operation. The present invention is shown as embodied in a tool for one such station. It is to be understood, of course, that the invention is not limited in usefulness to an attachment for this particular machine.

Fig. 1 is a plan view of the apparatus, shown in connection with the tool slide and spindle carrier of an automatic screw machine;

Fig. 2 is a side elevation;

Fig. 3 is an end elevation;

Fig. 4 is a vertical section, showing the tail piece, spider or cam holder in end elevation, taken on line 4—4, Fig. 2;

Fig. 5 is an end elevation similar to Fig. 2, but with the parts in a different operative position;

Fig. 6 is a vertical section on line 6—6, Fig. 5;

Fig. 7 is a horizontal section on line 7—7, Fig. 6, showing a detail of the support slide;

Fig. 8 is an end elevation partly in section, showing the support slide;

Fig. 9 is a view similar to Fig. 8, taken from the opposite side;

Fig. 10 is a top plan view of the support and the slide;

Fig. 11 is an end view partly in section, showing the tool holder slide;

Fig. 12 is a bottom plan view of the tool holder slide; and

Fig. 13 is a top plan view of the tool holder slide.

The device, as shown in the drawings, includes three principal divisions or assemblies; the tool slide, a cam holder attached to the tool holder, and a tool head slidably mounted on the tool slide and operated by cams secured to the cam holder. The arrangement is such that as the tool slide is moved into position, the cam holder will be advanced, thereby advancing the tool head and then by the action of the cams simultaneously moving the tool and the supports inward radially against the work.

A tool slide 1 is mounted on a spindle carrier 2 of conventional form, and in a conventional manner. As specifically shown, the slide and spindle are of the construction used in a "Gridley" automatic. The arrangement is such that at the proper phase, a cam, not shown in the drawings, advances the slide 1 (to the left as shown in Figs. 1, 2 and 5) so as to bring cutting or forming tools carried by the slide toward or against work W, which as specifically shown may be a bar.

A tool head, best shown in Fig. 6, is slidably mounted on the tool slide 1 and has a frame 3. The frame 3 has a way to accommodate a slide plate 4, which is secured by bolts 5 to the tool slide 1. Adjusting plates or shims 6, adjustable by set screws 7, are placed in the way against the edges of the plate 4. While the tool head which includes the frame 3 is slidably mounted on the tool slide 1, a cam holder which has a frame or spider 8 is rigidly fixed to the tool slide 1 by bolts 9. The spider 8 has a cam 10 for moving the tool 11, or rather the slide 12 which carries the tool, and cams 13 for moving the work support slides 14. Rods 15, rigidly secured to the frame 3, extend through holes 16 in the spider 8, and compressible springs 17 are around the rods 15 and have their ends positioned against the adjacent surfaces of the frame 3 and the spider 8, thereby normally urging the tool head and the cam holder away from each other, within the limits fixed by nuts 18 on the ends of the rods 15.

The tool holder or tool slide 12 is shown in detail in Figs. 11, 12 and 13. It includes a block 19 having a way 20, Fig. 5, in which is positioned the tool 11. The tool 11 has a tenon which fits the way or mortise 20. Clamping screws 21, positioned in holes 22, hold the tool in place. A roller 23 is positioned in a slot 24 and is mounted on a spindle 25 journalled in bores 26 in the block 19. Springs 27 are positioned in bores or sockets 28, each having an end bearing against the bottom of the socket, and the other end bearing against a plate or bracket 29 secured to the frame 3.

The block 19 has a dovetailed tenon 30 which is slidably positioned in a corresponding mortise 31 in the frame.

The plate cam 10 is projected forwardly from the spider 8 in a horizontal line, and passes through the slot 24 in such a manner that its cam face engages the roller 23. Thus as the cam is advanced with respect to the head, the block 19 and the tool 11 is pushed down in a vertical line and axially toward the center of the work.

The work support slides 14, which are two in number, are identical and hence a description of one will suffice for both. These slides are shown in detail in Figs. 8, 9 and 10. Each has a block or frame which has an integral portion, a dovetail tenon 32, slidably mounted in a mortise 33. The tenon has grooves or bores 34 in which are placed compressible springs 35. A roller 36 is positioned in a slot 37 and mounted on a spindle 38 journalled in holes 39. A roller or work rest 40 is journalled on the inner end of the slide 14 and is adapted to bear against the work.

The two cams 13 bear against the rollers 36 in the same manner that the cam 10 bears against the roller 23. All three cams 10 and 13 are rigidly connected to the spider 8, and are advanced simultaneously. Thus the cams advance the tool slide and the support slides simultaneously toward the center of the work.

An abutment or stop 41, Figs. 1, 2 and 5, on an adjacent part of the machine engages the tool head 3. It will be understood that at a proper phase in the cycle of the machine a cam, not shown, will push the tool slide 1 forwardly, or to the left, Figs. 1, 2 and 3, moving with it the integrally connected spider 8. This will also move, by the action of the spring 17, the tool head 3, until the tool head engages the stop 41. Further movement of the slide 1 by the cam will cause a relative movement between the spider 8 and the head 3, by reason of which the cams 10 and 13 will move the tool slide 12 and the support slides 14 simultaneously inwardly toward the axis of the work. Therefore, as the work is turned and reduced in diameter, the support slides carrying the rollers 40 will advance simultaneously, and form a support for the work opposite the cutting tool.

It is contemplated that various changes may be made in the details of construction, within the scope of the appended claims, without departing from the spirit of this invention.

I claim:

1. In a turning machine having a tool slide, an attachment comprising a tool head slidably mounted on the tool slide, a plurality of slides arranged in ways on the head radial to a common axis, a tool mounted on one of the radial slides and a work rest on each of the other (one or more) radial slides, a cam support rigidly connected to the said tool slide and resiliently connected and movable with respect to the tool head in such an arrangement that the head will be yieldingly advanced by the tool slide, means to restrain movement of the tool-head and a plurality of cams rigidly mounted on the support and contacting the said radial slides in such an arrangement that, when there is relative movement between the head and the support, the cams will move the slides simultaneously inwardly toward said axis.

2. In a turning machine having a tool slide, an attachment comprising a tool head slidably mounted in a way parallel to the tool slide, a plurality of slides arranged in ways radial to a common axis parallel to the tool slide, a tool mounted on one of the radial slides and a work rest mounted on each of the other (one or more) radial slides, a plurality of cams arranged and adapted to engage the radial slides respectively and by their movement parallel to said axis to move the said slides radially, a common support, to which the cams are rigidly connected, secured to said tool slide, a yielding connection between said support and the tool head, and a stop on the turning machine positioned to engage the tool head, whereby forward movement of the tool slide will advance the tool head until the tool head strikes the stop, after which movement of the tool slide with the said support while the tool head is held stationary by said stop will cause the cams to move the radial slides with their tool and work rests inwardly against work supported along said axis.

CORNELIUS A. BOLLWERK.